Nov. 5, 1963   R. L. DEEG, JR   3,109,446
FLUID LOCK STRUCTURE
Filed April 5, 1960
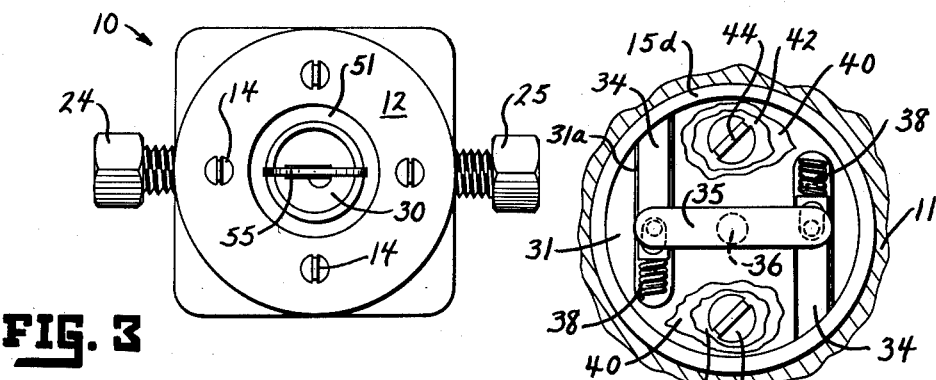
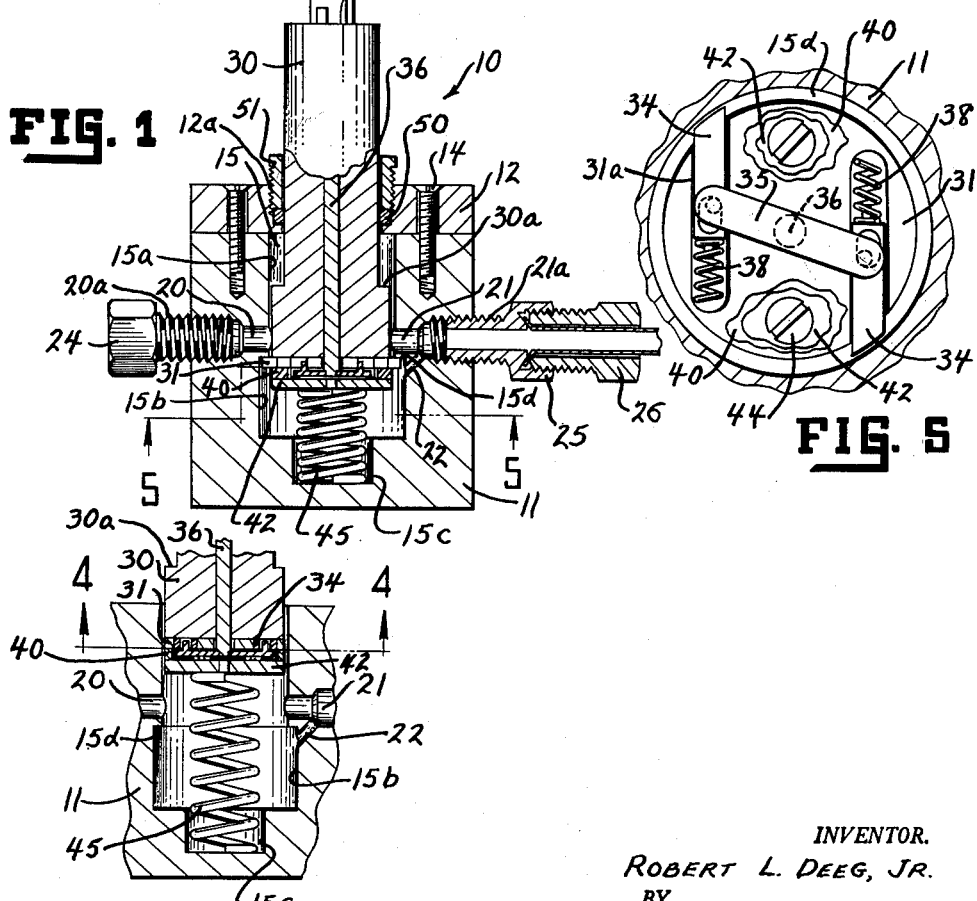
INVENTOR.
ROBERT L. DEEG, JR.
BY
Warren D. Hackbert
ATTORNEY

United States Patent Office 3,109,446
Patented Nov. 5, 1963

3,109,446
FLUID LOCK STRUCTURE
Robert L. Deeg, Jr., Rte. 3, Rockport, Ind.
Filed Apr. 5, 1960, Ser. No. 20,099
1 Claim. (Cl. 137—384.6)

The present invention relates to a fluid lock, and more particularly to a new and novel locking structure whereby the flow of fluid in a conduit may be selectively and effectively interrupted.

As is known, the number of automobile thefts has been widespread over the past years, with a particular problem being that of automobile theft while the owner or driver of the automobile is still at the wheel thereof, since the current automobile models include no safety provision for effectively preventing the latter.

By virtue of the instant invention, the applicant has provided a new and novel fluid lock structure which is disposed in the fuel line feeding to the carburetor of an automobile. In operation, and as a matter of a positive driver-controlled action, the flow of fuel in the line can be effectively and selectively interrupted, so that, upon theft, the automobile can be used only to the point of the amount of fuel remaining in the system between the fluid lock structure and the automobile carburetor. Moreover, the applicant's invention utilizes a key-operated locking mechanism to permit the fuel line to become unblocked and, hence, the automobile to become operative, only after unlocking has been effected.

Accordingly, the principal object of the present invention is to provide a new and novel fluid lock structure for selectively interrupting the flow of fluid in a conduit.

Another object of the present invention is to provide a new and novel fluid lock structure which utilizes a key-operated locking mechanism for returning the fluid lock to a position to permit fluid flow.

A further and more general object of the present invention is to provide a new and novel fluid lock structure made from a minimum number of components which combine to provide effective locking action for all types of fluid carrying conduits.

Other objects and a better understanding of the present invention will become more apparent from the following description, taken in conjunction with the accompanying drawing, wherein:

FIG. 1 is a view in side elevation, partly in vertical section, showing details of a typical fluid lock structure in accordance with the instant invention, with the fluid lock being in locked position;

FIG. 2 is a fragmentary view, in vertical section, showing the fluid lock structure of FIG. 1 in an unlocked position;

FIG. 3 is a plan view of the fluid lock structure of FIG. 1;

FIG. 4 is an enlarged view, in bottom elevation, of certain details of the structure forming the instant invention, generally taken at line 4—4 of FIG. 2 and looking in the direction of the arrows, however, with certain other structure shown for reasons of clarity; and, FIG. 5 is a view of the detailed structure of FIG. 4 in operative position, where such view is generally taken at line 5—5 of FIG. 1 and looking in the direction of the arrows, however, with certain other structure also shown for reasons of clarity.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's novel fluid lock 10 comprises, in a typical embodiment of the invention, a base section 11 and a top section 12, where the latter is typically secured to the former by a number of common screw members 14. As should be particularly evident from FIG. 1 and FIG. 2, the base section 11 has a recess 15 disposed therein, which recess 15 comprises a top portion 15a, an enlarged intermediate portion 15b which forms a shoulder 15d, and a bottom portion 15c having the smallest diameter of the three portions. Passageways 20 and 21 radially extend toward and connect with the top portion 15a of the recess 15, where such passageways 20 and 21 have internally threaded sections 20a and 21a for receiving conventional fittings 24 and 25. The fittings 24 and 25 connect to the fluid carrying conduit (not shown) through fittings in the system in which the instant fluid lock structure is disposed, one of which fittings 26 is representatively shown in the drawing. A passageway 22 is provided to directly connect the bottom portion 15c of the recess 15 to the passageway 21, for reasons to be discussed herebelow.

A plunger 30 extends through an opening 12a in the top section 12 of the fluid lock and into the recess 15 in the base section 11. The plunger 30 has channel-ways 31a disposed in a disc-like element 31 adjacent the lower end thereof (see FIGS. 4 and 5) or, in another form of the invention, the channel-ways 31a may be formed directly in the end of the plunger 30 without utilizing the element 31. In any event, the channel-ways 31a are adapted to receive control members 34 which are movable therein through the operation of a lever 35 disposed at an end of a shaft 36 which extends longitudinally through the plunger 30. Springs 38 are provided in the channel-ways 31a to urge the control members 34 in an outwardly direction.

Disposed around the lever 35 is a spacer member 40 which has a cutout portion therein to permit the rotation of the lever 35. An end member 42 is disposed beneath the spacer member 40 and operatively seats the shaft 36, permitting the rotation of the latter. Screw means 44 are provided to effectively unite the preceding structure. The end member 42 serves as a seat for a spring 45, while the bottom surface of the bottom portion 15c of the recess 15 serves as another seat.

The assembly is completed by the use of a gasket 50 to provide a seal between the top section 12 of the fluid lock 10 and the plunger 30, where the latter is operatively retained within the opening 12a in the top section 12 by a threaded collar 51. Although not disclosed in the drawing, a common lock mechanism having a key 55 is disposed at the upper portion of the plunger 30, and operatively connects to the shaft 36. As further sealing is required, a gasket (not shown) is disposed around the shaft 36 proximate the lock mechanism.

In use, and considering FIG. 2, where the lock mechanism is unlocked, fluid may freely pass from the system in which the fluid lock is installed through fittings 26 and 25, passageway 21, a chamber formed by the top portion 15a, the intermediate portion 15b and the bottom portion 15c of the recess 15, passageway 20, fitting 24, and into another conduit in the system, or conversely, if desired. In order to attain the above, the spring 45 forces the plunger 30 in an upward direction, considering the drawing, until a shoulder 30a formed on the plunger 30 engages the under surface of the top section 12 around the periphery of opening 12a therein. In this position, the control members 34 disposed at one end of the plunger 30 are so positioned, because of the tight, but yet movable, fit between the plunger 30 and top portion 15a of the recess 15, so that the free ends thereof do not extend beyond the outer surface of the plunger 30 (see FIG. 4).

When it is desired to utilize the fluid lock, the plunger 30 is moved downwardly, considering the figures, whereupon the control members 34 extend outwardly, through action of springs 38, when the plunger 30 is pushed below the shoulder 15d defined in the recess 15. The result of the above action is that the plunger 30 cannot thereafter be moved upwardly, unless the lock mechanism is released by use of the key 55. When the plunger 30 is in the aforesaid locking position, and as should be apparent from FIG. 1, communication is terminated between passageways 21 and 20 and, hence, flow of fluid is interrupted. In respect to the locking action, it should be understood that passageway 22 plays an important part in releasing the fluid disposed within the recess 15 as the plunger 30 is pushed downwardly, to thereby permit locking.

It should be understood from the preceding that the applicant has provided a new and novel fluid lock structure embodying a minimum number of operative components whereby fluid flow in a conduit in which the lock has been positioned can be quickly and effectively interrupted, as desired. In addition, in order to make the fluid lock structure operative once again, i.e. permit passage of the fluid, the applicant has included a normal key-operated lock mechanism which is utilized to release the fluid lock to an unlocking position.

The fluid lock described hereabove is susceptible to various changes within the spirit of the invention. For example, and importantly, although the preceding has typically disclosed the use of the fluid lock in combination with the fuel system of an automobile, it should be understood that the applicant's invention has considerable uses aside from the illustrated example. Moreover, the usual changes of form and proportion may be made, while still permitting the ready and effective utilization of the invention. In addition, aside from the key-operated lock mechanism disclosed hereabove in connection with the invention, it should be understood that other arrangements may also be utilized as, for example, a rotation of the plunger to effect unlocking action, or even a delayed action arrangement whereby intermittent force against a modified plunger ultimately serves as a releasing means therefor. Thus, the above description should be considered illustrative and not as limiting the scope of the following claim.

I claim:

A fluid lock structure comprising a housing having a chamber communicating with a line through which a fluid flows, a plunger member movably disposed within said chamber and selectively blocking fluid flow therethrough, a shaft extending through said plunger member, a control arm disposed on the inner end of said shaft adjacent to the inner end of said plunger member, said control arm being extendible when said plunger member is moved from a position within said chamber permitting fluid flow to a position within said chamber blocking fluid flow and said control arm adapted to be retained at a peripheral shoulder portion of said chamber at said fluid flow blocking position anywhere throughout a range of 360 degrees, said peripheral shoulder portion being integral with said chamber, spring means continuously urging said control arm into said retaining relationship with said peripheral shoulder portion of said chamber at said fluid flow blocking position of said plunger member, means at the outer end of said plunger member locking said plunger member at said fluid flow blocking position, said plunger member when in said fluid blocking position defining a space in said chamber having a reduced volume from that at said position of said plunger member permitting fluid flow, spring means adapted to bias said plunger member from said fluid flow blocking position to said fluid flow position when said control arm is unlocked, and a fluid pressure relief passageway communicating between said reduced space in said chamber and said line when said plunger member is at said fluid flow blocking position.

References Cited in the file of this patent

UNITED STATES PATENTS

| 2,713,989 | Bryant | July 26, 1955 |
| 2,845,943 | Perkins | Aug. 5, 1958 |
| 2,946,485 | Durner | July 26, 1960 |

FOREIGN PATENTS

| 146,001 | Great Britain | July 8, 1920 |